United States Patent
Bougaran

[15] 3,650,842
[45] Mar. 21, 1972

[54] ELECTROLYTIC, SECONDARY AND PRIMARY CELLS

[72] Inventor: Marcel Bougaran, Paris, France

[73] Assignee: Societe des Accumulateurs Fixes et de Traction (Societe Anonyme), Romainville, France

[22] Filed: July 18, 1969

[21] Appl. No.: 870,725

Related U.S. Application Data

[62] Division of Ser. No. 609,631, Jan. 16, 1967, Pat. No. 3,505,121.

[30] Foreign Application Priority Data

Apr. 1, 1966 France..................................56030

[52] U.S. Cl...........................................136/134
[51] Int. Cl..............................................H01m 35/32
[58] Field of Search............136/134, 13, 14, 15, 46, 53, 136/55, 68, 69, 70, 71, 83, 6, 120

[56] References Cited

UNITED STATES PATENTS

| | | | |
|---|---|---|---|
| 2,487,499 | 11/1949 | Webb | 136/13 |
| 3,503,806 | 3/1970 | Sugalski | 136/13 |
| 380,554 | 4/1888 | De Benardos | 136/70 |
| 3,393,095 | 7/1968 | Philipp | 136/83 |

FOREIGN PATENTS OR APPLICATIONS

| | | | |
|---|---|---|---|
| 1,059,004 | 2/1967 | Great Britain | 136/13 |
| 663,857 | 1/1965 | Belgium | 136/13 |
| 1,415,519 | 9/1965 | France | 136/13 |
| 689,603 | 6/1964 | Canada | 136/6 |

Primary Examiner—Winston A. Douglas
Assistant Examiner—M. J. Andrews
Attorney—Kenyon & Kenyon Reilly Carr & Chapin

[57] ABSTRACT

Electric cell constructions are provided with negative and positive electrodes having edges protruding respectively from opposite ends of an electrode assembly which latter includes a separator or separators between the positive and negative electrodes. Independent plate-like positive and negative electrode current collectors are located at respective opposite ends of the assembly. The respective plate-like members have shapes, e.g., of ray-like configuration and dimensions such as to cover or overlie only portions of such respective protruding edges and leave selected other portions of the respective edges of the electrodes completely uncovered. The plate-like members are welded directly and uniformly respectively to the entirety of those portions of the respective edges that they actually cover and contact. The electrodes comprise metallic carriers bearing active materials except in their edges which are bare of the active materials, and these bare edges of the carriers are those uniformly welded in entirety to the covering portions of the plate-like members.

3 Claims, 7 Drawing Figures

Patented March 21, 1972

INVENTOR
MARCEL BOUGARAN
BY
ATTORNEYS

Patented March 21, 1972　3,650,842

INVENTOR
MARCEL BOUGARAN
BY Kenyon & Kenyon
ATTORNEYS 3,650,842

ELECTROLYTIC, SECONDARY AND PRIMARY CELLS

This application is a division of my one-time copending application Ser. No. 609,631 now U.S. Pat. No. 3,505,121 dated Apr. 7, 1970.

BRIEF SUMMARY OF INVENTION

This invention relates to improvements in electrolytic secondary and primary cells and more especially to a method for affixing current collectors, and to devices making assembly easier.

The object of this invention may be considered as an improvement of already described processes, such as mentioned in French Pat. No. 1,415,519, filed the 18th of July, 1963 under the title: "PROCEDE D'AMENAGEMENT DE CELLULES ELECTROLYTIQUES ET D'ACCUMULATEURS ELECTRIQUES, ET CELLULES ET ACCUMULATEURS OBTENUS PAR CE PROCEDE"—"ELECTROLYTIC CELLS AND STORAGE CELLS ASSEMBLY" filed by the present assignee (no corresponding U.S. application).

According to the invention of said patent, collectors are spot-welded on the edges of electrodes of one polarity, said edges protruding from the electrode winding or block in which the electrodes of opposite polarities are insulated by an appropriate separator thus constituting components of an electrolytic secondary or primary cell.

The practice of that invention has many advantageous features, among which the following ones can be particularly noted:

the current is drained from many points located at the electrode edges;

the electrode winding or block, fitted with its two collectors forms a compact unit.

Consequently, electrolytic secondary and primary cells, with such arrangements are more rugged and can bear higher discharge rates than either secondary or primary equivalent cells using conventional collectors.

Nevertheless, the practical application of the process and invention as described in the said French Pat. No. 1,415,519 has given rise to some difficulties particularly in welding all points of the collectors in a correct and regular manner upon the corresponding edges of the electrodes.

The principal object and feature of the present invention is to overcome such difficulties.

The procedure according to the present invention consists more essentially in placing upon the edges of electrodes of a given polarity, which is part of a winding or of a block, at least one collector which leaves the said edges partly uncovered, then placing against and in contact with said electrodes in the said uncovered part of the edges and at least partly covering it, a counterelectrode of a welding set, and then welding the said collector to the said edges, by pressing the welding electrode of the said set against the said collector.

A further feature of the invention is that the above-mentioned counterelectrode at least partially, and leaving a given gap, surrounds the collector that has been placed over the electrode edges. In this way, the welding of the said collector to the electrode edges can be carried on correctly and evenly at every point, because the current path between the welding spot of the said collector and the counterelectrode area is very short.

Another object and feature of the present invention is to provide current collectors intended to be spot-welded over the electrode winding or block of an electrolytic secondary or primary cell, the said collector being particularly noteworthy in that it comprises a connecting post bound to a plate which covers only part of the said electrode edges while another part thereof is left uncovered.

Other objects and features of the invention will become apparent from the following description and accompanying drawings given only as examples wherein.

DETAILED DESCRIPTION

Figure 1:
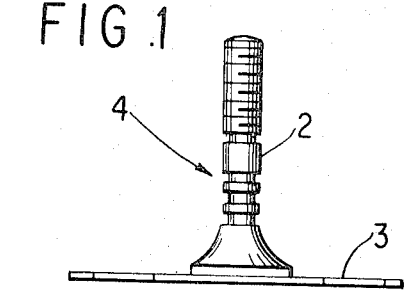
FIG. 1 is a front elevation of a collector means according to the present invention.
Figure 2:
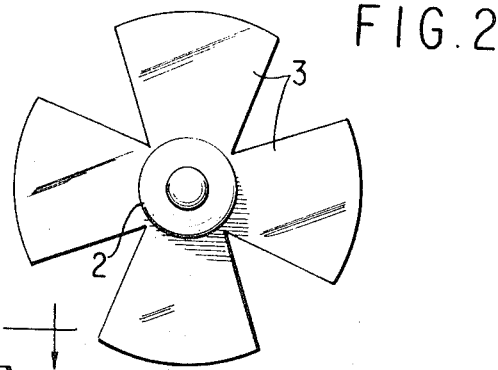
FIG. 2 is a plan view from above of the collector means shown in FIG. 1.
Figure 3:
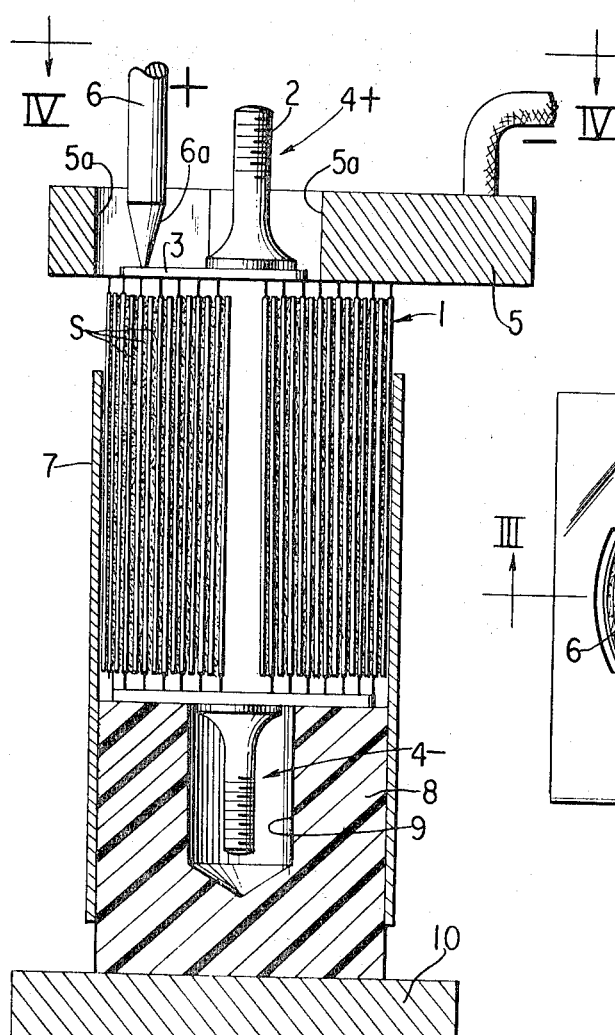
FIG. 3 shows a cross section along line III—III passing through the center of the FIG. 4, illustrating the process of welding the collector means according to the present invention.

Referring to the drawing, according to the embodiment shown in FIGS. 1–4 of the drawings, the invention is more particularly applied to an electrode assembly in the form of a winding denoted as 1 in FIG. 3. In this winding, the wound electrode of a given polarity has one of its edges protruding from one end of the winding, whereas the other wound electrode of opposite polarity has one of the edges protruding from the opposite end of said winding. Conventional separator means S is included between electrodes of opposite polarity in the winding.

According to the invention, in order to collect the current, the collector means 4+ and 4− each comprise a terminal or connecting post 2 permanently and electrically secured to a conductive platelike member 3. Each plate 3 is dimensioned and designed to cover only a fragmentary part of the electrode edge of a corresponding electrode of the winding 1, leaving the remaining edge parts thereof uncovered.

Figure 4:
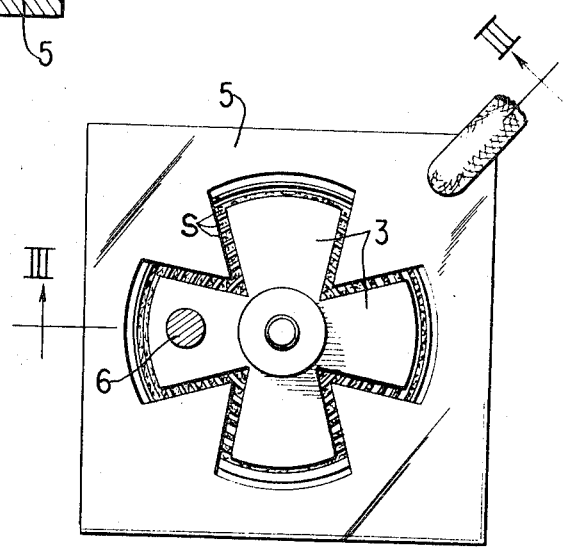
FIG. 4 is a plan view from above of FIG. 3 taken substantially along the cross section IV—IV thereof.

For example, as shown in FIGS. 2 and 4, each plate 3 may advantageously have ray-like configuration in the shape of a star or a Maltese cross, the rays or arms of which are separated by spaces and span substantially the entire width or diameter of the winding, covering underlying protruding edge parts of the particular electrode of the winding, but leaving uncovered those edge parts underlying the spaces between respective rays or arms.

According to this invention, the welding of the rays of plate 3 of a collector means 4 to underlying edge parts of an electrode in a winding 1 is achieved by placing the plate 3 of collector 4 at one end of winding 1, with its rays covering and in contact with the electrode edges to which it has to be welded.

A counterelectrode 5 of a welding set is then positioned in contact with the uncovered parts of the said electrode edge of winding 1 protruding from one of the ends of the latter, which are free or not covered by the collector 4. In FIG. 4, the counterelectrode 5 is shown as having an opening of slightly larger dimensions than the same apparent area as the Maltese-cross-shaped plate 3. As a result, a sufficient gap is left between the rays of the Maltese-cross-shaped plate 3 and the complementary shaped areas of the counterelectrode 5 as shown in FIG. 4 to prevent short circuit contact between the rays of plate 3 and counter electrode 5.

In the welding procedure, advantageously, the winding 1 can be partially inserted in a cylindrical casing 7 which, for example, is the casing of the cell being manufactured. The winding 1 contained in the casing may be firmly supported as by an insulating shim 8 telescopically slidable up and down inside the casing 7 as shown in FIG. 3.

The insulating shim 8 is provided with a receiving recess or hole 9 sufficiently large to lodge a collector 4 that may have been previously welded to the edge parts of the electrode protruding from the other end of the winding 1. The shim 8 may be, for instance, secured to a platen 10 which may be moved reciprocally upwards and downwards at will in any suitable way as indicated by the arrows.

With such an arrangement, spot-welding of the respective plates 3 is rendered easier because of the shortening of the current path between the welding electrode 6 and the welding counterelectrode 5 of the welding set, down to a fraction of a turn of winding. On the contrary, if a flat plate element wholly covering the protruding electrode edges were to be welded, a counterelectrode in contact with the outer turns of the electrode winding would have to be used. As a result, the welding of such a plate to edges at the center of the winding would require passage of a high current through the greater part of the winding, and uniformity of welding would not occur.

A further important advantage results from the fact that the welding current lines are well established leading to an even welding that cannot be obtained in other arrangements wherein current lines are poorly established and result in an uneven welding.

The plate 3 may advantageously be made of a material similar to the electrode carrier, for instance, being a steel sheet or plate, ultimately nickel plated, having a thickness which may be greater than the conductive electrode carriers of the active material of the respective electrodes. Electrode carrier edges protruding respectively from the opposite ends of the winding 1, comprise the carrier of the respective opposite polarity electrodes preferably bared of active material, that may thus be welded to plate 3 under the most favorable conditions.

Figure 6:
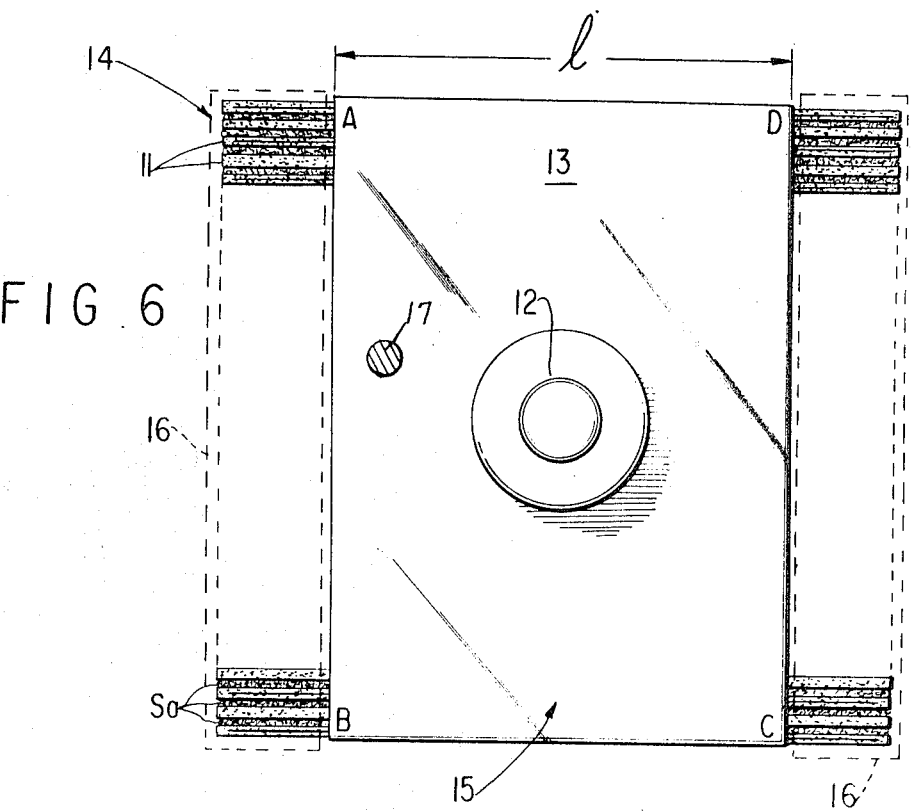
FIG. 6 is a plan view from above of the collector means of FIG. 5 shown in its applied position on an electrode block.
Figure 5:
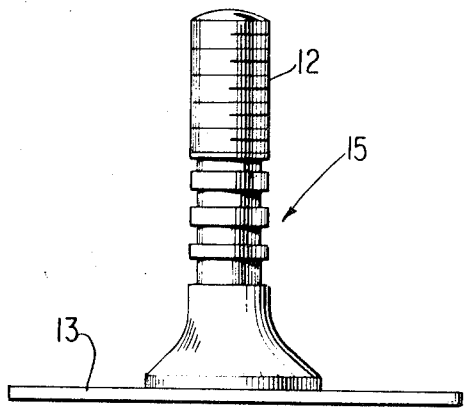
FIG. 5 is a front elevation of another collector means embodying the invention.

According to the embodiment of the present invention as shown in FIGS. 5 and 6, the practice thereof has been applied to a block or pile 14 of parallelly disposed positive and negative electrodes 11 with separator means Sa between electrodes of opposite polarity. Electrode carrier edges of one polarity only protrude from the respective opposite ends of the block 14.

According to the invention, the block 14 is capped by a collector 15 comprising a conductive terminal post 12 united with a plate 13, corresponding respectively to post 2 and plates 3 of FIGS. 1 and 2.

According to the embodiment shown in FIGS. 5 and 6, the width 1 of the plate 13 is selected so that it leaves free relatively large lengths of the electrode carrier edges adjacent its borders A-B and C-D. In other words, in length, the side borders A-B and C-D of the plate 13 span the entire group of electrode carrier edges of the electrode of the same polarity in block 14 which thus become parallel connected through plate 13 when the latter is welded thereto, whereas the sides A-D and B-C extend over only a part of the lengths of the protruding edges of the electrode carriers in the block 14.

To achieve the electrical welding of the plate 13 of collector means 15 to the protruding carrier edges of electrodes of the block 14, counter-electrodes 16 need merely be placed on portions of uncovered protruding carrier edge of electrodes alongside both borders A-B and C-D of plate 13 of the collector means 14.

Such counter-electrodes 16, being, for instance, rectangular in form, are positioned into contact with the protruding carrier edges of the electrodes of a given polarity extending outwardly along both borders A-B and D-C of the plate 13 and with the welding electrode 17 effect flow of welding current from the welding current source to weld the edges covered by plate 13 thereto. In this case, the welding can be effected under conditions very similar to those described with regard to FIGS. 3 and 4, and the distribution of the welding currents is very satisfactory. The welding electrode being shown at 17.

Figure 7:
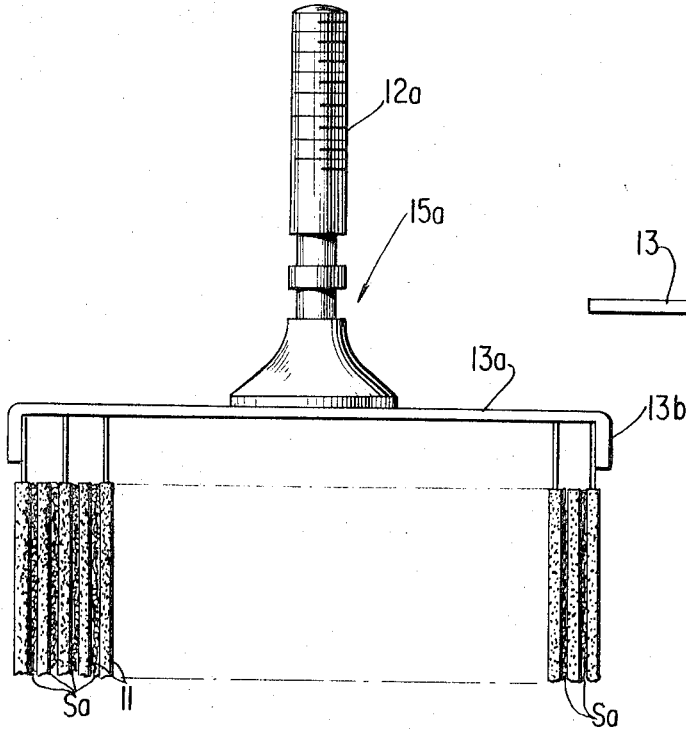
FIG. 7 shows a front elevation of another embodiment of the collector means useful in practicing the invention.

FIG. 7 shows a collector means 15a comprising a terminal post 12a and a plate 13a which latter has flanges 13b folded down so that the flanges resulting from folding form a kind of jaw into which the protruding like polarity edges of electrode carriers to be welded are inserted. The welding to said plate 13a is then carried on, as described above.

A further feature of interest with respect to the process according to the invention is that, the resulting electrode blocks or windings have an excellent mechanical cohesion: this is due to the fact that the form, and relative positions of the electrodes therein that have been imposed prior to and maintained during the welding operation, are maintained indefinitely as a result of the uniform welding to the plates of the respective collectors.

Many variations and improvements may be effected in the above-mentioned embodiments. Particularly, the welding electrode 6 may in its major portion, except for the active tip end 6a, be covered with an insulating coating (not shown) which makes the welding operation easier and quicker and eliminates the risk of short circuiting between the electrode 6 and the adjacent inner wall 5a of the counterelectrode. The latter may also be insulated on its inner wall 5a, if desired.

Similarly, automation of the welding operation can be provided insuring the supply of electrode blocks or windings, the supply of collector means, the setting of the counter-electrodes, possibly the welding operation itself, the removal of the counter-electrodes and the removal of electrode blocks or windings. Should the welding operation be entirely automated, several parallel connected welding electrodes 6 might be then advantageously used being positioned in well-defined locations and symmetrically applied on the plate 3.

Thus, while specific embodiments of the invention have been herein described or illustrated, variations within the scope of the appended claims are possible and are contemplated. There is no intention, therefore, of limitation to the exact disclosure herein presented.

What is claimed is:

1. An electric cell comprising an assembly having opposite ends and including electrodes of different polarity and separator means between such electrodes, an electrode of one polarity having an edge protruding only at one end of the assembly and an electrode of second polarity having an edge protruding only at the other end of said assembly, collector means positioned at each end of said assembly and welded to selected areas only of the respective protruding edge of the respective electrodes in the assembly, said assembly being a winding of said electrodes and separator means, each said electrode comprising a metallic carrier and active material, said protruding edge of each of the electrodes being portions of the metallic carrier thereof free of active material, and each said collector means including a terminal post and a platelike member, each such platelike member being dimensioned and shaped to provide a ray-like configuration to overlie contact and cover only selected areas of the respective protruding electrode edge it overlies and being welded uniformly to the entirety of such edge is said areas.

2. An electric cell according to claim 1 wherein said assembly is a winding of opposite polarity electrodes and said separator means, wherein each platelike member has arms defining a ray-like configuration with spaces between the arms, said arms covering said selected areas of the respective edge of each electrode and said spaces providing said other areas of each said protruding edge which remain uncovered.

3. An electric cell according to claim 2, wherein said ray-like configuration resembles a Maltese cross.

* * * * *